US006929382B2

(12) United States Patent
Kuisma

(10) Patent No.: US 6,929,382 B2
(45) Date of Patent: Aug. 16, 2005

(54) LIGHTING FIXTURE

(75) Inventor: Jouko Kuisma, Lahti (FI)

(73) Assignee: Teknoware Oy, Lahti (FI)

( * ) Notice: Subject to any disclaimer, the term of this patent is extended or adjusted under 35 U.S.C. 154(b) by 117 days.

(21) Appl. No.: 10/361,498

(22) Filed: Feb. 10, 2003

(65) Prior Publication Data

US 2003/0179574 A1 Sep. 25, 2003

(30) Foreign Application Priority Data

Feb. 12, 2002 (FI) .............................................. 20020282

(51) Int. Cl.[7] .................................................. F21V 4/00
(52) U.S. Cl. ........................ 362/219; 362/479; 362/545; 362/241; 362/247
(58) Field of Search ................................ 362/800, 545, 362/241, 247, 219, 223, 479, 484

(56) References Cited

U.S. PATENT DOCUMENTS

| | | | |
|---|---|---|---|
| 2,217,688 A | | 10/1940 | Larson et al. |
| 2,525,537 A | * | 10/1950 | Fletcher ..................... 52/720.1 |
| 3,060,309 A | * | 10/1962 | Pascucci et al. ............ 362/223 |
| 3,158,330 A | * | 11/1964 | Van Steenhoven .......... 362/223 |
| 3,275,822 A | * | 9/1966 | Wince et al. ................ 362/223 |
| 4,171,535 A | * | 10/1979 | Westermann ............... 362/406 |
| 4,387,415 A | | 6/1983 | Domas |
| 4,434,385 A | * | 2/1984 | Touho et al. ................ 313/161 |
| 4,876,633 A | * | 10/1989 | Engel ......................... 362/223 |
| 5,025,355 A | * | 6/1991 | Harwood .................... 362/147 |
| 5,171,085 A | * | 12/1992 | Jaksich ....................... 362/147 |
| 5,716,123 A | * | 2/1998 | Lamming ................... 362/222 |
| 5,791,764 A | * | 8/1998 | Jaksich ....................... 362/222 |
| 5,857,758 A | * | 1/1999 | Dealey et al. .............. 362/551 |
| 6,179,452 B1 | | 1/2001 | Dunning |
| 6,471,371 B1 | * | 10/2002 | Kawashima et al. ........ 362/235 |
| 6,561,690 B2 | * | 5/2003 | Balestriero et al. ......... 362/555 |
| 6,601,971 B1 | * | 8/2003 | Ko ............................. 362/219 |
| 6,739,735 B2 | * | 5/2004 | Talamo et al. .............. 362/249 |
| 2001/0046136 A1 | * | 11/2001 | Weber et al. ............... 362/494 |
| 2002/0048176 A1 | * | 4/2002 | Ruda et al. ................. 362/551 |
| 2003/0048641 A1 | * | 3/2003 | Alexanderson et al. ..... 362/470 |

FOREIGN PATENT DOCUMENTS

| | | |
|---|---|---|
| EP | 0 514 963 | 11/1992 |
| FR | 2620396 A1 | 3/1989 |
| GB | 919075 | 2/1963 |
| WO | WO 98/06024 A1 | 2/1998 |

* cited by examiner

Primary Examiner—Thomas M. Sember
Assistant Examiner—Jacob Y. Choi
(74) Attorney, Agent, or Firm—Leydig, Voit & Mayer, Ltd

(57) ABSTRACT

A lighting fixture, which is arranged to receive two or more elongated light sources positioned one after another in the longitudinal direction of the light sources, the lighting fixture comprising one or more connecting devices, which are arranged to supply energy to the light sources in order to burn them and positioned in a region between the successive light sources in the lighting fixture, and a globe part and a background part, which are arranged to be connected to one another and to substantially surround the light sources and the connecting devices. The lighting fixture further comprises one or more cover plates, which are arranged at the connecting devices between the globe part and the background part of the lighting fixture to substantially cover the connecting devices, and one or more second light sources, which are arranged in connection with the cover plate to provide lighting from the region between the successive elongated light sources.

20 Claims, 3 Drawing Sheets

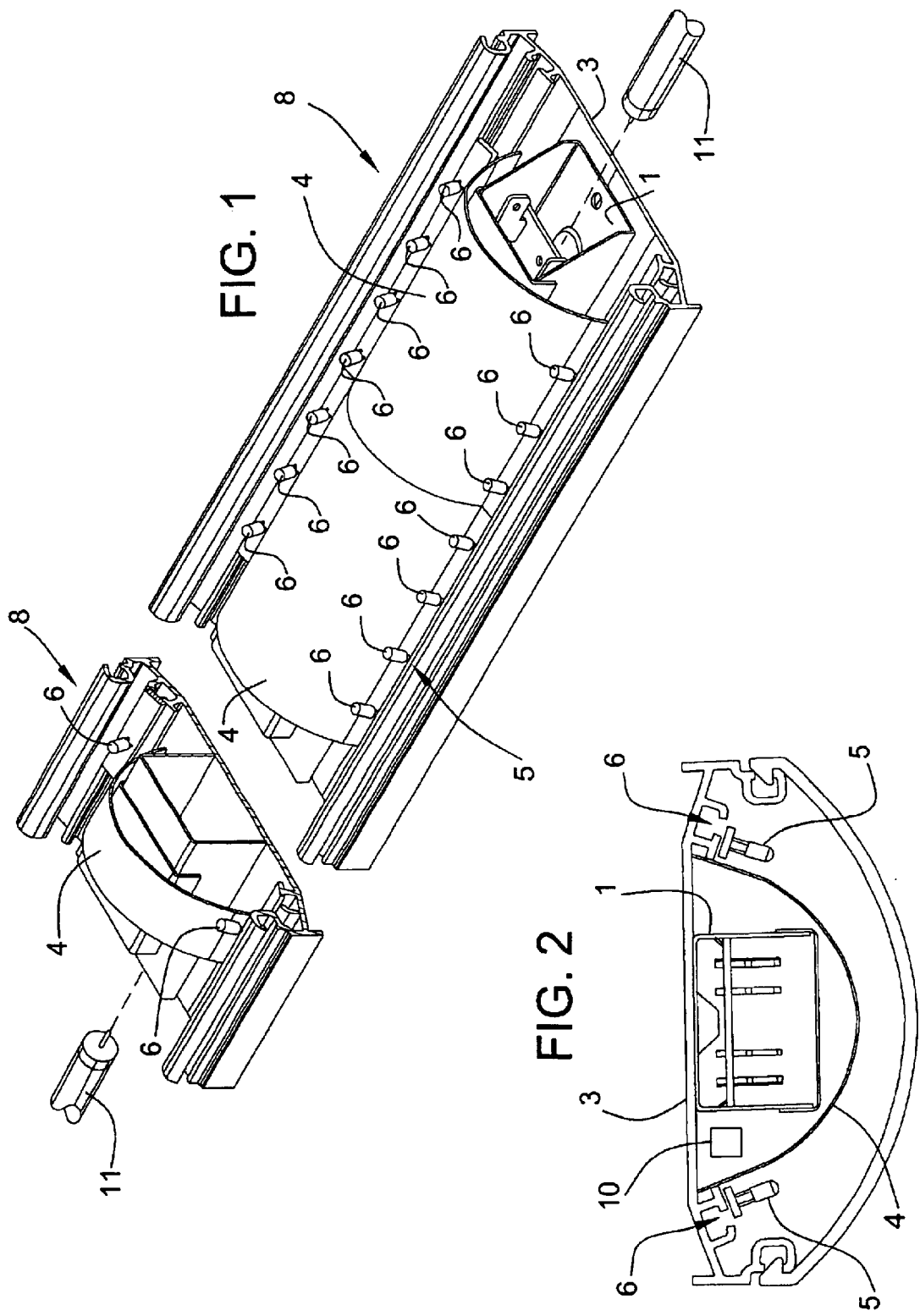

US 6,929,382 B2

LIGHTING FIXTURE

BACKGROUND OF THE INVENTION

The present invention relates to a lighting fixture, which is arranged to receive two or more elongated light sources positioned one after another in the longitudinal direction of the light sources, the lighting fixture comprising one or more connecting devices, which are arranged to supply energy to the light sources in order to burn them and positioned in a region between the successive light sources in the lighting fixture, and a globe part and a background part, which are arranged to be connected to one another and to substantially surround the light sources and the connecting devices.

The interiors of public transport vehicles are typically illuminated by light lines, i.e. light fixtures with a length of the passenger cabin. The purpose of light lines is to provide an even lighting over the entire distance of the line so that the light line would not have shadows or significant deviations in the intensity of lighting it provides. Conventional light lines are implemented by mounting a continuous lighting fixture on the roof of the passenger cabin, whereby fluorescent lamps positioned one after another act as a light source. Using fluorescent lamps also requires connecting devices, which are positioned between the successive fluorescent lamps inside the lighting fixture. A region with no lighting is thus formed at the connecting devices and the lighting of the light line becomes discontinuous.

The weight and minimum height of many transport vehicles are adjusted by different norms. This sets specific requirements for lighting fixtures to be used, since the lighting fixtures are usually mounted on the roof of a transport vehicle, such as a bus, train or an aeroplane. One way of implementing a continuous light line is to position the light sources to be used, such as fluorescent lamps, to slightly overlap one another and to position the connecting device outside the structure of the actual lighting fixture. In this case, the connecting device should have a separate space in the roof of the passenger cabin, which space can be provided by an embedding formed behind the frame of the lighting fixture, for instance. In this case, too, the available space is limited. In addition, the wiring between the light sources and the connecting device must be led through the frame of the lighting fixture behind the actual lighting fixture, which increases mounting and maintenance expenses. If the connecting device also has a high frequency, the required wiring can, be a significant electromagnetic interference source.

Another presented solution for positioning a connecting device in connection with a continuous light line is to make the structure of the lighting fixture so large that the connecting device can be positioned behind the light sources inside the lighting fixture. In this case, however, the lighting source becomes physically large and expensive, and such a big lighting fixture cannot be placed reasonably in the roof of a passenger cabin of a transport vehicle. Such a solution is described in U.S. Pat. No. 4,387,415.

Passenger cabins of transport vehicles also have night lighting, which is switched on when the passengers are sleeping. In case of night lighting, the intensity of the lighting is low to provide favourable sleeping conditions and to ensure that the driver of the vehicle has an unrestricted view to the outside. The night lighting should, however, be intense enough to allow passengers to move in the passenger cabin, if necessary. In most cases, the night lighting is provided by separate small incandescent lamps, which are positioned inside the general lighting fixture and which can be switched on independently of the general lighting fixture.

BRIEF DESCRIPTION OF THE INVENTION

It is an object of the present invention to provide a lighting fixture avoiding the above drawbacks and allowing implementation of a continuous light line in a simple manner so that the size of the lighting fixture is not bigger than that of current known lighting fixtures. The object is achieved with a lighting fixture according to the invention, characterized in that the lighting fixture further comprises one or more cover plates, which are arranged at the connecting devices between the globe part and the background part of the lighting fixture to substantially cover the connecting devices, and one or more second light sources, which are arranged in connection with the cover plate to provide lighting from the region between the successive elongated light sources.

The invention is based on the idea that a separate cover plate is positioned at the connecting devices of the lighting fixture, and a number of smaller light sources are arranged in connection with the cover plate.

These light sources illuminate the globe of the lighting fixture, either by reflecting light from the cover plate or directly, whereby a continuous and unbroken light line is provided.

With the solution according to the invention, a continuous light line, particularly of small height, is provided, and no embeddings for connecting devices need be formed at the light line. The height of the lighting fixture of the invention does not differ from the previously known lighting fixtures, and so the globe part or background part of the lighting fixture need not be processed in the solution of the invention.

With the solution according to the invention, it is also possible to provide night lighting with a lower luminous efficiency particularly in passenger cabins of public transport vehicles.

BRIEF DESCRIPTION OF THE FIGURES

The invention will now be described in greater detail in association with preferred embodiments and with reference to the attached drawings, in which FIG. 1 is a perspective view of a part of an embodiment of a lighting fixture according to the invention;

FIG. 2 is a cross-section of the lighting fixture of the embodiment according to FIG. 1;

DETAILED DESCRIPTION OF THE INVENTION

Figure 3:
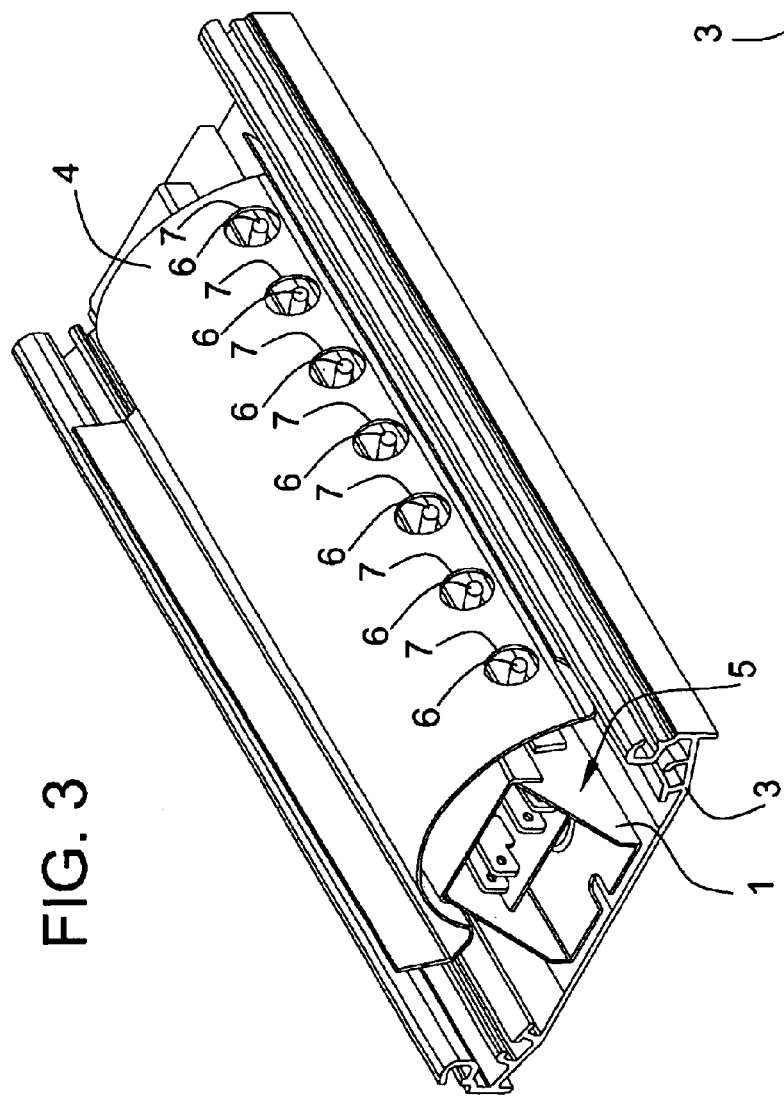
FIG. 3 is a perspective view of a part of a second embodiment of the lighting fixture according to the invention.

The lighting fixture of the invention, whose partial schematic structure according to an embodiment is shown in FIG. 1, is arranged to receive two or more elongated light sources positioned one after another. Elongated light sources are typically fluorescent lamps. The light sources are positioned one after another in the longitudinal direction to provide a long light line. The light line and the lighting fixture of the invention can be made as long as desired. The lighting fixture of the invention can thus have the length of a passenger cabin of a bus, for instance. The lighting fixture of the invention can also be implemented so that the lighting fixture comprises two parallel light sources. Compared with one lighting fixture, the luminous efficiency can thus be correspondingly increased.

The lighting fixture of the invention also comprises one or more connecting devices 1, which are arranged to supply energy to the light sources in order to burn them and positioned in a region 8 between the successive light sources 11 in the lighting fixture. FIG. 1 shows a part of the lighting fixture specifically at the connecting device 1. The connecting device is intended to supply power to one or more fluorescent lamps.

The lighting fixture of the invention further comprises a globe part 2 and a background part 3, which are arranged to be connected to one another and to substantially surround the light sources and the connecting devices 1. Both the connecting device and the fluorescent lamps are located inside the lighting fixture, i.e. in the space between the background part and globe part of the lighting fixture. For the sake of clarity, FIG. 1 does not show the globe part of the lighting fixture either. FIG. 2 is a cross-section of the lighting fixture of the embodiment according to FIG. 1, the cross-section being taken along the connecting device 1. It is to be understood that the light sources 11 are placed on both sides of the connecting device in the longitudinal direction of the lighting fixture.

In accordance with the invention, between the globe part 2 and background part 3 of the lighting fixture there is one or more cover plates 4, which are positioned at the connecting devices 1 in order to substantially cover them. A cover plate is an object, which is positioned inside the lighting fixture so that substantially the whole connecting device or at least most of the connecting device remains behind the cover plate. The connecting device is usually fixed to the background part of the lighting fixture. The cover plate 4 is thus mounted between the globe part 2 and the connecting device 1, whereby the cover plate covers the connecting device, seen from the space illuminated with the lighting fixture. In the embodiments of the figures, the cover plate is shaped to generally follow the shape of the globe part. The height of the cover plate can be selected so that the cover plate fits in the lighting fixture structures generally in use.

The lighting fixture of the invention further comprises one or more second light sources 5, which are arranged in connection with the cover plate 4 to provide lighting from the region 8 between the successive elongated light sources 11. As mentioned earlier, in the lighting fixture of the invention the connecting devices 1 are positioned between the light sources and the cover plates 4 are arranged to cover the connecting devices. The second light sources 5 positioned in connection with the cover plates provide lighting which is reflected from the cover plate, thus giving an impression of a continuous light line. A cover plate can be made of a material, the surface of which reflects light at least partly. If required, the surface of the cover plate can be treated in a desired manner to reflect light.

In accordance with a preferred embodiment of the invention, the second light sources 5 consist of a group of light sources 6, such as LED lamps, i.e. light-emitting diodes. According to the embodiment shown in FIGS. 1 and 2, the second light sources, i.e. a group of LED lamps, are positioned in the space between the cover plate 4 and the globe part 2. The figures show how the second light sources 5 are positioned substantially at the intersection of the background part and the cover plate. However, the location of the light sources can be freely selected at the cover plate. In the embodiments shown in the figures, the LED lamps are fixed to a connecting plate, which is, for instance, a band made of a silicon card and which is further fixed to an installation object.

Figure 4:
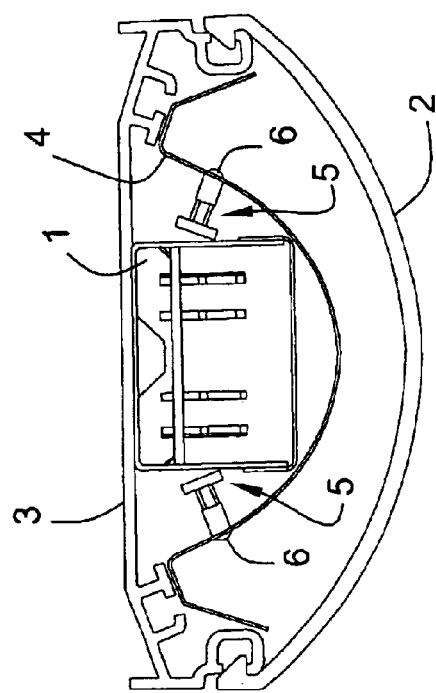
FIG. 4 is a cross-section of the lighting fixture of the embodiment according to FIG. 3.

The light sources to be positioned at the cover plate can provide either direct or indirect lighting. In the embodiments of FIGS. 3 and 4, the cover plate comprises openings 7, and the LED lamps 6 acting as the second light sources are under the cover plate, i.e. on the same side of the cover plate as the connecting device. In this case, the light of the LED lamps falls softer on the globe part of the lighting fixture. The positioning of the LED lamps can also affect the lighting of the globe part at the connecting device. As appears from the embodiment of FIG. 4, the LED lamps are fixed to the outer surface of the connecting device, and the openings 7 in the cover plate are located at the LEDs. The figure shows how the LED ends partially protrude through the openings in the cover plate. The figure also shows how the edges of the cover plate are shaped, this shape being utilized for indirectly reflecting the light of the LED lamps to the globe part. The edges of the cover plate are bent away from the connecting device and the ends of the edges almost reach to the edge of the globe part. Thus, the edges of the cover plate reflect the light of the LEDs efficiently and the light is distributed evenly on the globe part.

In the lighting fixture of the invention, the cover plates 4 are typically fixed to the background part 3 of the lighting fixture. The fixing can be implemented detachably by using different kinds of connectors, whereby, in case of failure, the connecting device can be replaced in a known manner by removing the cover plate first from the lighting fixture.

The second light sources 5 of the lighting fixture according to the invention can be supplied by the same connecting device as the fluorescent lamps, but also by a specific connecting device 10. It is often easier to use a separate connecting device 10, because the connecting devices of fluorescent lamps should in any case be electrically adapted suitably.

Figure 5:
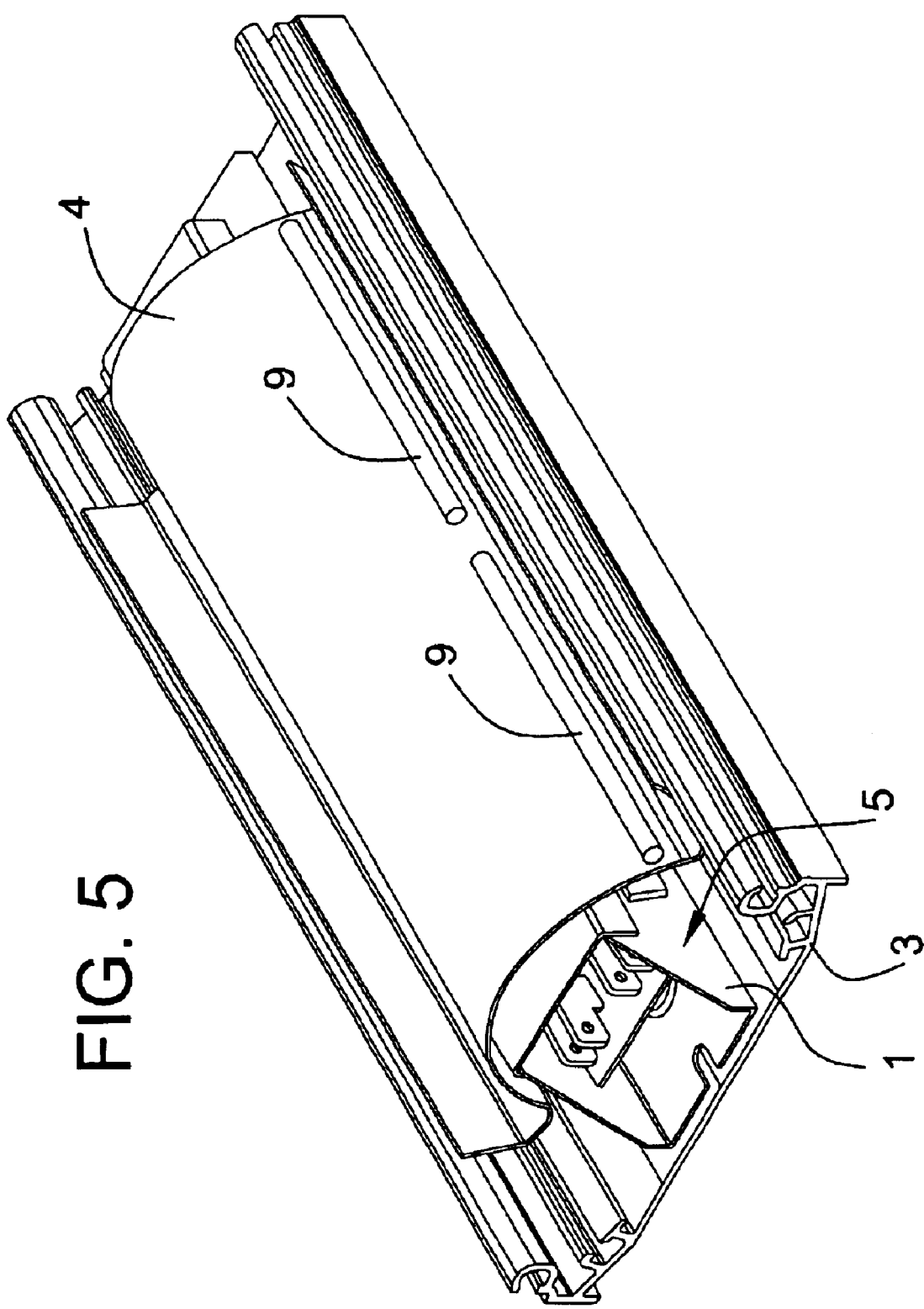
FIG. 5. is a perspective view of a part of a third embodiment of the lighting fixture according to the invention.

According to a preferred embodiment of the invention, the second light source 5 is an optical fiber 9 emitting light from its entire length as shown in FIG. 5. Such an optical fiber 9 or several fibers can be positioned in connection with the cover plate in a simple manner. The optical fiber can be supplied by, for instance, a low-power LED lamp, the light of which that the fiber distributes from its entire length. Being a flexible element, the fiber can be placed arbitrarily inside the lighting fixture. Another solution for a second light source to be used in the lighting fixture of the invention is a fluorescent film also represented in FIG. 5 by reference number 9. Such a film fits in a small space and its luminous efficiency is high enough for implementing the lighting fixture of the invention.

Since in the lighting fixture of the invention the connecting devices are inside the lighting fixture, the lighting fixture is an entity which can be surface-mounted easily and which does not require embeddings in the installation object nor any additional space for mounting the lighting fixture.

As mentioned earlier, the second light sources 5 providing a lower luminous efficiency are positioned in the lighting fixture of the invention. These light sources can be managed independently of the actual lighting fixtures, which are intended to create general lighting. The low-power, second light sources 5 positioned in connection with the cover plate can thus be used for providing dimmer night lighting. The night lighting, which is provided by the lighting fixture of the invention in the above manner, is sufficient, for instance, for safely moving in the central aisle of a bus in dark conditions.

It will be obvious to a person skilled in the art that with the advance of technology, the basic idea of the invention can be implemented in a plurality of ways. Thus, the invention and its embodiments are not confined to the above examples but can vary within the scope of the claims.

What is claimed is:

1. A lighting fixture, which is arranged to receive two or more elongated light sources positioned one after another in the longitudinal direction of the light sources, the lighting fixture comprising:
   one or more connecting devices, which are arranged to supply energy to the light sources in order to burn said light sources, the connecting devices being positioned in a region between the successive light sources in the lighting fixture,
   a globe part and a background part, which are arranged to be connected to one another and positioned to substantially surround the light sources and the connecting devices,
   one or more cover plates, which are arranged at the connecting devices between the globe part and the background part of the lighting fixture to substantially cover the connecting devices, and
   one or more second light sources, which are arranged in connection with the cover plate to provide lighting from a region between the successive elongated light sources, wherein the elongated light sources and second light sources are of different types.

2. A lighting fixture as claimed in claim 1, wherein the elongated light sources are fluorescent lamps.

3. A lighting fixture as claimed in claim 2, wherein the second light source is arranged in a space between the cover plate and the background part and that the cover plate comprises openings substantially at the second light source.

4. A lighting fixture as claimed in claim 2, wherein the second light source is arranged in a space between the cover plate and the globe part.

5. A lighting fixture as claimed in claim 1, wherein the second light source is a group of light sources.

6. A lighting fixture as claimed in claim 5, wherein the group of light sources comprises several LED lamps.

7. A lighting fixture as claimed in claim 5, wherein the second light source is arranged in a space between the cover plate and the background part and that the cover plate comprises openings substantially at the second light source.

8. A lighting fixture as claimed in claim 5, wherein the second light source is arranged in a space between the cover plate and the globe part.

9. A lighting fixture as claimed in claim 6, wherein the second light source is arranged in a space between the cover plate and the background part and that the cover plate comprises openings substantially at the second light source.

10. A lighting fixture as claimed in claim 6, wherein the second light source is arranged in a space between the cover plate and the globe part.

11. A lighting fixture as claimed in claim 1, wherein the second light source is an optical fiber emitting light from its entire length.

12. A lighting fixture as claimed in claim 11, wherein the second light source is arranged in a space between the cover plate and the background part and that the cover plate comprises openings substantially at the second light source.

13. A lighting fixture as claimed in claim 11, wherein the second light source is arranged in a space between the cover plate and the globe part.

14. A lighting fixture as claimed in claim 1, wherein the second light source is a fluorescent film.

15. A lighting fixture as claimed in claim 14, wherein the second light source is arranged in a space between the cover plate and the background part and that the cover plate comprises openings substantially at the second light source.

16. A lighting fixture as claimed in claim 14, wherein the second light source is arranged in a space between the cover plate and the globe part.

17. A lighting fixture as claimed in claim 1, wherein the second light source is arranged in a space between the cover plate and the background part and that the cover plate comprises openings substantially at the second light source.

18. A lighting fixture as claimed in claim 1, wherein the second light source is arranged in a space between the cover plate and the globe part.

19. A lighting fixture as claimed in claim 1, wherein the lighting fixture is a surface-mountable lighting fixture.

20. A lighting fixture as claimed in claim 1, wherein the lighting fixture also comprises a second connecting device for the second light sources.

* * * * *